(12) United States Patent
Williams

(10) Patent No.: US 8,121,346 B2
(45) Date of Patent: Feb. 21, 2012

(54) TARGET TRACKING

(75) Inventor: Mark Lawrence Williams, Bristol (GB)

(73) Assignee: Bae Systems PLC, London (GB)

( * ) Notice: Subject to any disclaimer, the term of this patent is extended or adjusted under 35 U.S.C. 154(b) by 1145 days.

(21) Appl. No.: 11/910,582

(22) PCT Filed: Jun. 8, 2007

(86) PCT No.: PCT/GB2007/002125
§ 371 (c)(1),
(2), (4) Date: Oct. 3, 2007

(87) PCT Pub. No.: WO2007/144580
PCT Pub. Date: Dec. 21, 2007

(65) Prior Publication Data
US 2009/0310820 A1 Dec. 17, 2009

(51) Int. Cl.
G06K 9/00 (2006.01)
(52) U.S. Cl. ........................ 382/103; 348/169
(58) Field of Classification Search .................. 382/100, 382/103, 106, 107, 209, 215, 217; 348/169–175
See application file for complete search history.

(56) References Cited

U.S. PATENT DOCUMENTS

| 5,581,657 A | 12/1996 | Lyon |
| 2001/0051936 A1 | 12/2001 | Michalewicz |
| 2003/0219147 A1* | 11/2003 | Nishiura ........................ 382/103 |
| 2004/0146183 A1* | 7/2004 | Shimoni ........................ 382/103 |
| 2006/0193495 A1 | 8/2006 | Kurokawa |

FOREIGN PATENT DOCUMENTS

| EP | 0 474 307 B1 | 3/1992 |
| EP | 0 992 935 A2 | 4/2000 |

OTHER PUBLICATIONS

Form PCT/ISA/210 (International Search Report) dated Aug. 24, 2007.
Form PCT/ISA/237 (Written Opinion of the International Searching Authority) dated Aug. 24, 2007.
European Search Report dated Oct. 4, 2006.
United Kingdom Search Report dated Sep. 28, 2006.

(Continued)

Primary Examiner — Anand Bhatnagar
(74) Attorney, Agent, or Firm — Buchanan Ingersoll & Rooney PC

(57) ABSTRACT

A method and system are disclosed for tracking a target imaged in video footage. The target may, for example, be a person moving through a crowd The method comprises the steps of: identifying a target in a first frame; generating a population of sub-templates by sampling from a template area defined around the target position; and searching for instances of the sub-templates in a second frame so as to locate the target in the second frame. Sub-templates whose instances are not consistent with the new target position are removed from the population and replaced by newly sampled sub-templates. The method can then be repeated so as to find the target in further frames. It can be implemented in a system comprising video imaging means, such as a CCTV camera, and processing means operable to carry out the method.

16 Claims, 2 Drawing Sheets

OTHER PUBLICATIONS

Figure 1:
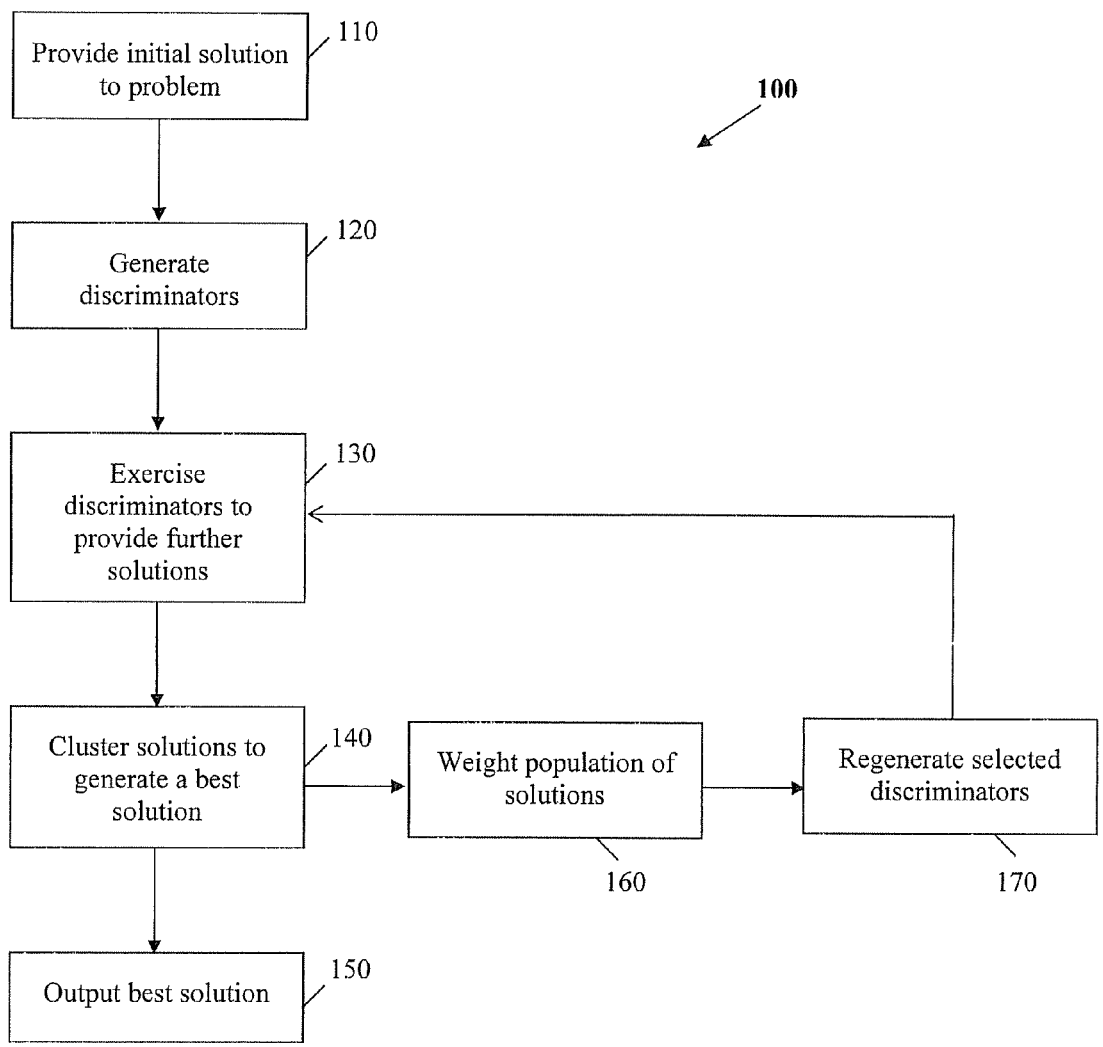

Mathias Kölsch et al., "Fast 2D Hand Tracking With Flocks of Features and Multi-Cue Integration", Proceedings of the 2004 IEEE Computer Society Conference on Computer Vision and Pattern Recognition Workshops, Computer Society, Jun. 27, 2004, 8 pages, XP-010761939.

Mathias Kölsch et al., "Flocks of Features for Tracking Articulated Objects", Springer Science Business, 2005, pp. 67-83, XP-002401443.

Yi-Sheng Yao et al., "Tracking a Dynamic Set of Feature Points", IEEE Transactions on Image Processing, Oct. 4, 1995, vol. 4, No. 10, pp. 1382-1395, XP-000537706.

Shih-Ping Liou et al., "Video Talk: A Collaborative Environment for Video Content Discussion", Jun. 7, 1999, Multimedia Computing and Systems, vol. 2, pp. 454-459, IEEE International conference on Florence, Italy, XP-010519432.

S. Gong et al., "Dynamic Vision: From Images to Face Recognition", 2004, 2 pages; XP-002401444.

L. D. Stone et al., "Tract-To-Track Association and Bias Removal", Database Accession No. 7524294, XP-002401646.

Giuseppe Mastronardi et al., "Video Saurus System: Movement Evaluation by a Genetic Algorithm", CIMSA, Jul. 29-31, 2003, pp. 49-51.

A. Carbonaro et al., "Object Tracking in a Varying Environment", Jul. 15-17, 1997, vol. 1, Conference Publication No. 443, pp. 229-233.

Takuya Akashi et al., "Genetic Lips Extraction Method With Flexible Search Domain Control", KES 2004, vol. 1, pp. 799-806.

Notification of Transmittal of the International Preliminary Report on Patentability issued in corresponding International Patent Application No. PCT/GB2007/002125 dated Jun. 5, 2008, The International Preliminary Examining Authority (Forms PCT/IPEA/416, 409, PCT/Separate Sheet/409 and Amended Sheet).

J. MacQueen, "Some Methods for Classification and Analysis of Multivariate Observations" published in 1967 in pp. 281to 297 of vol. 1 of the Proceeding of the 5th Berkeley Symposium on Mathematical Statistics and Probability by the University of California Press, Berkeley.

Kiscanin et al., "Real—Time Vision for Human—Computer Interaction" Springer Science Business, 2005, New York, XP 002401443, Chapter "Flocks of Features for Trackin Articulated Objects" pp. 67-83.

* cited by examiner

TARGET TRACKING

This invention relates to a method for tracking targets, such as people, imaged in video footage (for example, CCTV footage). More particularly, the method comprises using a seeded unsupervised learning method to improve tracking of slow moving targets through a series of image frames.

Both supervised and unsupervised learning methods are known, for example in the field of neural networks, and in the field of combination of classifiers. Supervised learning methods use ground truth to adapt a classifier so as to improve its performance. Unsupervised learning methods search for correlations within training data sets. The designer of the unsupervised learning algorithm can determine the kinds of structure that the algorithm seeks to learn, but cannot dictate what is learned. The data sets determine what is learned. Genetic algorithms, for example, can be considered to be unsupervised learning methods.

Learning methods have been applied to the problem of tracking targets, such as people, imaged in video footage. Prior known people-tracking methods include template matching techniques, in which an initial template, which can be learned in advance or captured at initial detection or nomination of the target, is used to locate the target. Such tracking systems are unfortunately unreliable, being vulnerable to failure when targets are occluded, when targets change shape (as, for example, a person walking along a high street may change shape from a standing position, in which legs and arms are close to the body, to a walking position, in which the legs and arms may be much further away from the body), when targets change aspect, or even when light conditions change. Moreover, such currently known tracking systems are vulnerable to false target detection, particularly when trying to track targets moving through crowds.

It is an object of the present invention to overcome, or at least partially mitigate, some of the above-mentioned problems. It is a further object of the invention to provide an improved method for tracking targets imaged in video footage that is better able to track targets that may repeatedly occluded, or change shape or appearance.

In broad terms, the present invention resides in the concept of maintaining of a population of weak classifiers, and repeatedly replacing a selection of the population in accordance with a consistency-based weighting function. The classifier population can be used, for example, to locate the target in each image frame taken from video footage. The weighting function weights against the use of classifiers that do not agree with a current target location, and seeks to replace them with new classifiers that are more likely to be consistent with the current best solution. The classifiers may also be called sub-templates.

According to a first aspect of the present invention, there is provided a method of tracking a target imaged in video footage, the method comprising the steps of:
(i) identifying the target to be tracked in a first image frame, the target being located at a first position;
(ii) generating a first population of sub-templates by sampling from a first template area defined around the first position;
(iii) searching for an instance of each of the first population of sub-templates in a second image frame, and determining the location of each instance in the second image frame;
(iv) identifying a second position of the target in the second image frame in dependence on the locations of the instances;
(v) generating a second population of sub-templates, which second population comprises a selection of the first population of sub-templates, and a set of new sub-templates, the selection being chosen in dependence on the locations of the instances of each of the sub-templates in the second frame, and the set of new sub-templates being generated by sampling from a second template area defined around the second position; and
(vi) iterating steps (iii) to (v) above in respect of further image frames, using the second population of sub-templates and the second position from a preceding iteration in place of the first population of sub-templates and the first position, thereby determining a series of target positions, and inferring the target track therefrom.

The method of tracking a target above is advantageously operable to track a target moving through environments in which it may be repeatedly occluded, and to track targets that may change shape or appearance when moving. The method is therefore expected to find application in the tracking of targets such as people moving through crowds, as may be captured by CCTV footage. Such tracking is more reliable than that possible with prior-known tracking systems, and can be accomplished in real time. The method is also expected to find application in the tracking of targets such as vehicles that may be imaged in video footage captured by aircraft.

The step of searching for an instance of each of the first population of sub-templates in a second image frame, and determining the location of each instance in the second image frame, may comprise determining the location of a best match for each of the first population of such templates in the second image frame. The best match may be determined, for example, using a correlation-like process The step of generating the second population of sub-templates may comprise associating a weight with each of the first population of sub-templates, the weight being related to the location of the instance of said each sub-template in the second frame relative to the second position. The weight may be given one of two values in dependence on whether the instance of its associated sub-template is located within or without the second template area. Other weighting allocations are possible, but such a binary system is advantageously simple to implement, and reduces the level of computing power required to implement the method.

The selection of the first population of sub-templates may comprise sub-templates having instances within the second template area. The selection of the first population of sub-templates retained in the second population therefore comprises sub-templates whose instances are consistent with the second position, and at least some of the sub-templates that are inconsistent with the second position are discarded.

An upper limit may be set for the number of sub-templates in the set of new sub-templates. The upper limit can be determined by experiment for any given problem to which the method may be applied. It will depend, in particular, on the rate at which the system, and therefore the solution, is expected to change: for systems in which fast evolution of the solution is expected, large upper limits are set. The upper limit may be in the range between 5% and 50% of the number of sub-templates in the first population of sub-templates. More preferably, the upper limit may be in the range between 15% and 25% of the number of sub-templates in the first population of sub-templates. In one embodiment described in detail hereinbelow, the upper limit is 20% of the number of sub-templates in the first population of sub-templates.

The step of identifying a second position of the target may comprise the step of determining a permitted area, and constraining the second position to lie within the permitted area.

The step of determining a permitted area may comprise providing a maximum target speed, and determining the permitted area in dependence on the maximum target speed, the first position, and the time elapsed between the first and second image frames.

The area of the first and second image frames may be much larger than the area of the first and second template areas. Advantageously, the search for sub-templates can then be performed over a much larger area that the area in which the target is constrained to lie. By including, in the scope of the search for instances of the sub-templates, a large background area, it is possible to ensure that ineffective sub-templates, whose best-match positions lie in areas in which it is impossible for the target to be, can be removed from the population of sub-templates.

The step of identifying a second position may comprise applying a clustering process to the locations of the instances of the first population of sub-templates in the second image frame. The clustering process may comprise the step of convolving a cluster function with the population of instances of the first population of sub-templates, and the second position is the position having the highest value of the resulting convolution. The cluster function may have a shape approximately equal to the target template.

According to a second aspect of the invention, there is provided a tracking system comprising imaging means operable to generate video footage, and processing means operable to carry out a method of tracking a target as described above. The imaging means may comprise a CCTV camera to provide video footage in which a target can be tracked.

According to a third aspect of the present invention, there is provided a method for determining a solution to a problem, the method comprising the steps of:
  (i) providing an initial solution to an initial instance of problem;
  (ii) generating a first population of discriminators, each of the discriminators being operable to calculate solutions to instances of the problem, given the initial solution;
  (iii) operating the first population of discriminators to calculate a first population of solutions to a first instance of the problem;
  (iv) determining a best solution from the first population solutions;
  (v) generating a second population of discriminators, which second population comprises a selection of the first population of discriminators, and a set of newly generated discriminators, the selection being chosen in dependence on differences between the first population of solutions and the best solution; and
  (vi) repeating steps (iii) to (v) above in respect of further instances of the problem, using the best solution and the second population of discriminators from a preceding iteration in place of the initial solution and the first population of discriminators; thereby generating a series of best solutions to further instances of the problem.

This method is applicable to a wide range of problems. It is applicable to any problem where a current best solution can be used as ground truth, and is therefore particularly useful for solving problems for which an actual measure of ground truth is not available. It is fundamentally different to both prior-known supervised and unsupervised learning methods. In contrast to prior-known supervised learning methods, there is no need for a ground truth to be provided at each iteration of the method: conveniently, ground truth need only be provided for initialisation. In contrast to prior-known unsupervised learning methods, the method adapts to an assumed ground truth, rather than to pre-determined criteria. The method is advantageously self-adapting, able to maintain an adaptive population of discriminators aimed at solving each new instance of the problem.

The step of generating a second population of discriminators may comprise the step of associating a weight with each of the first population of discriminators, the weight of each of the first population of discriminators being determined in dependence on the difference between the solution calculated by said each discriminator, and the best solution. The selection may then be chosen in dependence on the weights associated with each of the first population of discriminators. The weight may, for example, be a binary weight.

The step of determining a best solution may comprise the step of identifying a permitted solution space. The step of determining a best solution may further comprise applying a clustering process to the population of subsequent solutions.

An upper limit may be set for the number of discriminators in the set of newly generated discriminators. The upper limit can be determined by experiment for any given problem to which the method may be applied. It will depend, in particular, on the rate at which the system, and therefore the solution, is expected to change: for systems in which fast evolution of the solution is expected, large upper limits are set. In one specific embodiment described herein, the upper limit is 20% of the total number of discriminators in the first population.

Advantageously, the first population of solutions may be calculated in a solution space larger than the permitted solution space. This provides an unequivocal means of removing poor discriminators from the population of discriminators: if a discriminator generates a solution that is known to be impossible, then it is clearly a poor discriminator that should be removed from the population of discriminators. This also helps to ensure that the discriminators are able to reach the best solution more efficiently.

The invention extends to a computer program product operable, when inserted into a computer, to carry out a method as described above.

Figure 2:
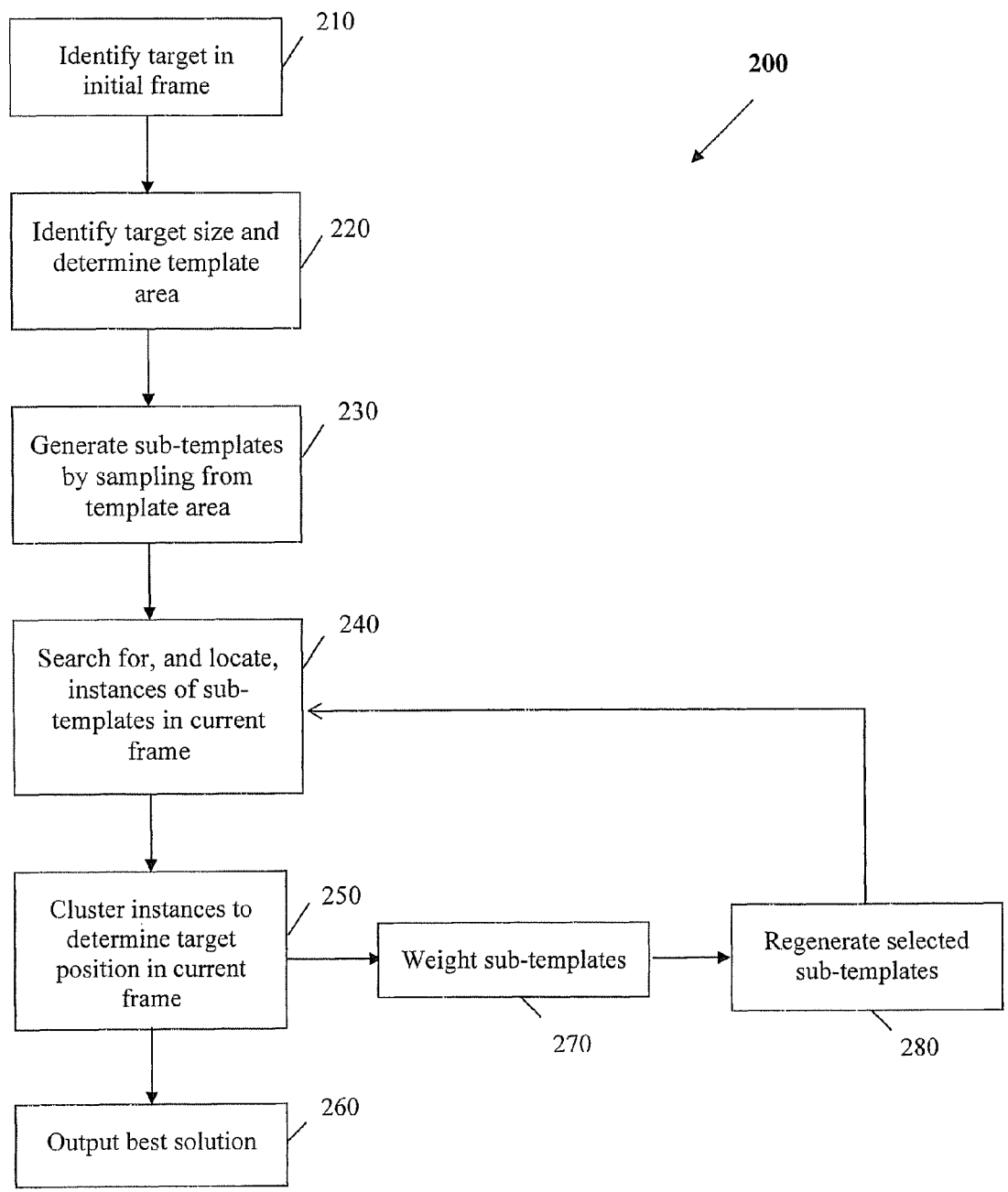

The above and further features of the invention are set forth with particularity in the accompanying claims, and will be explained in detail in the following description, with reference to various exemplary embodiments which are illustrated in the accompanying drawings, in which:

FIG. 1 is a flow chart schematically illustrating steps carried out as part of a method in accordance first embodiment of the invention; and FIG. 2 is a flow diagram schematically illustrating steps carried out as part of a method in accordance with a second embodiment of the invention.

The present invention makes use of a general framework for solving problems that has been developed by the inventors. The framework method is initiated by providing an initial solution to an initial instance of the problem, and then is able to determine subsequent solutions to subsequent instances of the problem, without further input. It is applicable to any problem in which the best solution to a current instance of the problem can be treated as an approximation to ground truth, and is therefore particularly useful where a ground truth measurement is not available. The inventors have named this general framework a self-adapting discriminant (SAD) filter.

The SAD filter is a hybrid between supervised and unsupervised learning methods. Unsupervised learning is carried out, based on an initial seed solution, but a supervised learning approach is used to generate future solutions to future instances of the problem: it is assumed that the solution generated by a previous iteration is, in fact, ground truth. The SAD filter is therefore fundamentally different from both supervised and unsupervised learning methods. Before describing the tracking method of the present invention, the SAD filter will be described with reference to an unspecified problem, so that the tracking method can be more readily understood.

A flow diagram 100 illustrating steps carried out as part of the SAD filter method is illustrated in FIG. 1. The filter is initialised at step 110 by providing an instance of the problem to be solved, and a solution to the instance of the problem. This solution acts as a seed solution. The seed solution, and successive future solutions, impose constraints on solutions to later instances of the problem, such that a permitted solution space can be defined for each future instance of the problem. It is noted that, once thus initialised, the filter is able to generate solutions to future instances of the same problem without any further input from an operator.

Given an initial solution to an initial instance of a problem, it is possible to generate algorithms, called discriminators, which are able to provide solutions to future instances of the problem. These discriminators are chosen such that they produce solutions consistent with the initial solution to the initial problem. A first population of discriminators is generated at step 120, based on the initial solution to the initial instance of the problem. This first population of discriminators is exercised at step 130 to provide a first population of solutions to a second instance of the problem. The discriminators are exercised over a problem space that is much larger than the permitted solution space defined by the constraints imposed by the initial solution. Exercising the discriminators over such a large problem space ensures that appropriate discriminators, that are consistent with a best solution determined at step 140 (described below), can be selected in preference to less appropriate discriminators.

At step 140, a best solution to the second instance of the problem is generated from the first population of solutions. Clustering is performed on the population of solutions so as to generate a best solution. The best solution can be taken to be an average from the largest cluster within the permitted solution space. Clustering methods are well known to those skilled in the art. For example, K-means clustering is disclosed by J. B. MacQueen in the paper "Some Methods for Classification and Analysis of Multivariate Observations", published in 1967 in pages 281 to 297 of volume 1 of the Proceedings of the $5^{th}$ Berkeley Symposium on Mathematical Statistics and Probability by the University of California Press, Berkeley. The best solution generated at step 140 is taken to be ground truth for the next instance of the problem. The best solution is communicated to an operator at step 150.

At step 170, a number of the first population of discriminators are regenerated. Each of the first population of discriminators is given a weight in dependence on the proximity of its associated solution to the best solution determined at step 140. Discriminators having a solution close, in the solution space, to the best solution, are given a high weight. Discriminators having solutions far from the best solution are given low weights. Those discriminators selected to be retained are those having the highest weights, whilst those selected to be regenerated are those having the lowest weights. Thus, those discriminators whose solutions are furthest from the best solution are discarded, and a set of new discriminators is generated in their place. However, an upper limit to the fraction of the first population of discriminators that can be regenerated in any one iteration of the method is applied.

The set of new discriminators is generated using the same methods as used at step 120, such that a second population of discriminators is generated. It is to be understood that the second population is the same as the first population, except for those discriminators regenerated at step 170. Given sufficient computational power, it is preferable to repeat the process of discriminator regeneration, that comprises the loop formed by steps 130, 140, 160, and 170, until a stable population of discriminators is achieved for the second instance of the problem. However, it is also possible simply to operate this loop once for each successive instance of the problem in the event that there is insufficient computational power to reach a stable population of discriminators in the time available between instances of the problem. The method can therefore be used to calculate successive solutions to successive instances of the problem, with no input from an operator after initialisation.

One particular problem to which the above-described SAD filter can be applied is the problem of tracking a target captured in CCTV (closed circuit television) footage. Typically, the target may be a person in a high street, or a shop. Once a specific person is designated as a target, the problem that must be solved is essentially that of redetection of that target, since the high frame rate and relatively low target speed reduce the problem of generating an actual target track to that of joining the detection instances in each frame. Whilst the problem may initially appear to be simple, it can, in practice, prove to be more complex than initially expected. In particular, there exist difficulties in re-detecting targets moving in crowds, in which targets may be repeatedly obscured by other potential targets, and where there may be other objects or persons appearing very similar to the designated target.

Steps carried out as part of a first embodiment of the invention for tracking a target through CCTV footage illustrated in the flow diagram 200 shown in FIG. 2. The steps are illustrated in flow diagram 200 will be described with reference to the SAD filter illustrated in FIG. 1, such that the relationship between the SAD filter and the target-tracking method can be clearly understood. For the sake of clarity, it is noted that those steps illustrated in FIG. 1 are given reference numbers beginning with the digit "1", whilst those steps illustrated in FIG. 2 are given reference numbers beginning with the digit "2". The method described is applicable to video imagery obtained from static cameras. The target may, for example, be a person moving through a crowd.

In the general method illustrated in flow diagram 100 illustrated in FIG. 1, the first step 110 is that of initialisation. At the initialisation step, an initial solution is given to an initial instance of the problem. In the case of the target tracking problem, the SAD filter initialisation occurs at steps 210 and 220. Step 210 comprises the identification and location of the target, such as a person, in an initial frame. This initial step can be carried out by a human operator. The problem is then to redetect and relocate the target in a subsequent, second frame. Step 220 comprises determining the target size, and defining a template area. The template area is chosen to have a size approximately equal to the target, and is centred on the centre of the target. Its shape is chosen for convenience. In the present embodiment, the template area is chosen to be rectangular.

The second step in the general SAD filter method is that of generating a first population of discriminators, illustrated as step 120 in the flow diagram 100. In the tracking embodiment illustrated in the flow diagram 200 shown in FIG. 2, this step comprises generating a first population of sub-templates by sampling from within the template area. The sub-templates are areas that are chosen randomly from within the template area. The area of each sub-template is small in comparison to that of the template area.

The performance of the first embodiment of the invention improves as the number of sub-templates generated increases, at the cost of a significant additional computational load. This improvement continues until there are sufficient sub-templates for it to be highly probable that every useful feature in the target is included in at least one template. It will be readily understood by those skilled in the art that useful features are those that distinguish the target from the local background. Thus the optimum number of sub-templates in the first population of sub-templates is a function not only of the ratio between target size and sub-template size, but also of the image content. Given sufficient computational resource, a very large population of sub-templates, with a range sizes, may be used. A larger population is expected to exhibit greater diversity, and therefore is more likely to include useful features. However, it is possible, given the random method by which sub-templates are generated, to generate multiple sub-templates which are identical, or very similar. Unfortunately, artificial attempts to maintain high levels of diversity in the population of sub-templates have, to date, led to decreased performance, and therefore, since the random method of generating sub-templates can lead to an increase, as well as a decrease, in the diversity of the sub-template population, no such artificial diversity-enhancing measures have been used. In the present embodiment, in which the targets are people moving through crowds imaged in CCTV footage, the template area is 130×15 pixels, and twenty sub-templates, each of area 4×4 pixels are sampled at random from within the template area. These quantities may be compared to an overall image area of approximately 150,000 pixels. Clearly, the actual values for the various areas will be strongly dependent on the images available, and the best values for given video footage can be readily determined, by those skilled in the art, using a process of trial and error.

Step 130 in the general SAD method is that of exercising the discriminators in order to generate a first population of solutions. This corresponds, in the tracking implementation of the SAD filter, to step 240, which comprises searching for, and locating the best match for each of the sub-templates in a second frame. The search for the best match for each sub-template is performed over an area $S_{wide}$ that is much larger than the target area $S_{target}$. For example, the area $S_{wide}$ may be chosen to be the entire area of the second frame. Choosing $S_{wide}$ to be much larger than $S_{target}$ ensures that sub-templates that do not discriminate between the target and the background effectively can be distinguished from those that do effectively discriminate: those that do not effectively discriminate are more likely to have best-match instances outside the small permitted area. These sub-templates can then be easily removed form the first population of sub-templates during the adaptive update steps 270 and 280 described below.

A correlation-like process is used to determine the best match position. The sub-template is moved through candidate positions throughout the second frame, and a score is calculated for each candidate position. In the present embodiment, the score is calculated by counting the number of template pixels that are more than a threshold value different to the image pixels at the candidate position. The candidate position with the lowest score is then taken to be the best match position for that sub-template.

Step 140 in the general SAD method is that of clustering the population of solutions in order to generate a best solution. This step corresponds to step 250 in the tracking implementation of the SAD filter, and comprises clustering the instances of the first population of sub-templates found in the second frame, and selecting the best cluster of template positions within a permitted area $S_{narrow}$ to be the new target position. $S_{narrow}$ can be determined using knowledge of the amount of time elapsed between the initial frame and the second frame, and an estimate of the maximum possible target speed.

The clustering procedure used in the present embodiment comprises convolving a weighting template with the point distribution of the template best match positions calculated at step 240, and taking the highest valued point on the resulting surface to be the new target position. The weighting template is approximately target shaped, and is peaked towards the target centre. A rectangular weighting template is used in the present embodiment. It is noted, however, that the precise details of the weighting template do not significantly affect the performance of the tracker, and that the most appropriate weighting template for a given target can readily be determined by experiment. It is further noted that the requirement for the best cluster to be within $S_{narrow}$ ensures some consistency between the target positions in the initial and second frames.

The new target position is then accepted as ground truth, and can be communicated to a user at step 260, corresponding to step 150 in the general SAD filtering method. An adaptive update is then performed at steps 270 and 280 before attempting to locate the target in the next frame. The adaptive update is used to generate a new, second, population of sub-templates, by discarding at least some of those sub-templates that are inconsistent with the new assumed ground truth, and re-sampling from a new template area that is the same size as the previous template area, but centred on the new target position. This is accomplished, in the tracking implementation of the SAD filter, by assigning a weight to each of the sub-templates at step 270, and then regenerating selected sub-templates at step 280. It is noted that the second population of sub-templates is the same as the first population, except for those sub-templates that are regenerated.

In the present embodiment, a binary weighting is assigned to each of the first population of sub-templates in dependence on the location of the best-match instance of each sub-template in the second frame relative to the new target position, at step 270. An area $S_{target}$ is defined, which corresponds to a template area centred on the new target position. The weighting has a value of zero if the best-match instance for that sub-template in the second frame is outside the area $S_{target}$, and a unit value if the best-match instance for that sub-template in the second frame is within the area $S_{target}$. A maximum proportion of 20% of sub-templates is re-generated in any one iteration. All sub-templates having a weighting of zero, up to 20% of the sub-template population, are regenerated at step 280. In the event that the proportion of sub-templates having a weighting of zero exceeds 20%, a number of sub-templates corresponding to the maximum proportion are chosen randomly from those having a weighting of zero. The new sub-templates are regenerated by sampling at random from a template area centred on the new target position, with a small additional weighting being applied in favour of sampling from areas of the second frame where image pixels have changed relative to the initial frame. The additional weighting improves the likelihood of generating a sub-template that is on-target.

The method can then be iterated by using the second population of sub-templates at step 230 in a further frame. This iteration enables a target to be tracked throughout CCTV footage. The SAD filter is particularly suited to the people-tracking application described in the above, since, as the target moves, the population of sub-templates changes, and adapts to the target. The population of sub-templates thus continually adapts towards a population ideally suited to discriminating between the target and possible false detections.

The benefits and advantages of using the SAD filter for people-tracking can be readily understood with reference to a simple example. If, in a first frame, a person wearing red trousers and a black top and moving through green vegetation is selected as the target, the population of sub-templates generated at step 230 is likely to be composed primarily of red and black regions. If a new person, wearing a red coat, enters a subsequent frame, many of the red sub-templates will favour the new person, find their best match outside $S_{target}$ and be regenerated. This regeneration process will favour black sub-templates. The new person may approach the target person, and may eventually enter the area $S_{narrow}$. However, by the time the new person lies within $S_{narrow}$, the sub-template population will contain many more black sub-templates than red sub-templates. The new person will therefore be unlikely to be mistaken for the true target person by the tracking system. Prior-known people-tracking algorithms, such as the mean-shift colour histogram algorithm, would be significantly more likely to fail in this scenario. If a further new person, wearing red trousers and a black top, approaches the target person, all the sub-template population would be open to regeneration. In this case, it is possible that embodiments of the present invention would fail, but it is likely that some details of the local structure of the target person would prove to be sufficient discriminators to prevent such a potential false detection. For example, if a number of sub-templates were in the region of the red-black boundary between the target's trousers and top, they may capture details of the shape of that boundary that would prove sufficient to distinguish the actual target from the potential false target.

The present embodiment of the invention has been shown to work well in a variety of situations, including through car parks, crowded shops, and crowded streets. In all these situations, prior known people tracking methods are liable to fail rapidly. In contrast, the SAD filter people-tracker is able to track a given target despite low resolution imagery, and repeated, sometimes complete, occlusion of the target. Furthermore, in these situations, the tracker has been shown to cope successfully with targets that repeatedly change aspect, such that the target may look quite different, at the end of the track, to its originally-nominated appearance. For the purpose of the tests performed to date, target-nomination is achieved by hand selection of the target centre point in an initial frame.

It is to be understood that the specific embodiments described above are in all respects exemplary. Variations and modifications are envisaged, and will be immediately obvious to those skilled in the art. For example, whilst in the above it has been described to initialise the tracking by human target nomination, those skilled in the art will immediately recognise that automatic target nomination may be appropriate in some circumstances. Such automatic nomination could be achieved through change detection, looking for approximately 'person-sized' areas of pixel change in order to nominate a target. Such a technique would be appropriate where it is possible to acquire the target in a situation that is relatively uncluttered. Other techniques may be more appropriate in other circumstances. Furthermore, the maximum proportion of sub-templates to be regenerated in any one iteration of the tracking implementation of the SAD filter, described above to be 20%, can be varied in dependence on the target environment, expected levels of target occlusion, or expected stability of the target to variable lighting conditions. The best choices of the method used to calculate scores for candidate positions for sub-template matches, and the method used to cluster the sub-template best match positions to calculate a new target position will depend on the specific application of the invention, and can be determined experimentally on a case-by-case basis. The scores for the candidate positions can, for example, be determining a total difference between corresponding template and image cells, rather than counting the number of cells having a difference greater than a predetermined threshold value as is described above. Similarly, the relative sizes of the sub-template area, template area and target area, and the maximum fraction of the sub-template population allowed to be regenerated after each iteration, will vary in dependence on the application of the invention. These parameters can be adjusted to suit particulars such as target type, background, frame rate, and computation power. The above-described tracking method can also be easily modified in order for a target to be tracked through video footage recorded by a non-static camera. Either the additional weighting given to changed pixels at the sub-template regeneration step 280 can be removed, or the additional weighting used can be reduced, as may be appropriate for semi-static cameras.

Finally, it is noted that it is to be clearly understood that any feature described above in relation to any one embodiment may be used alone, or in combination with other features described, and may also be used in combination with one or more features of any other of the embodiments, or any combination of any other of the embodiments.

The invention claimed is:
1. A method of tracking a target imaged in video footage, the method comprising the steps of:
  (i) identifying the target to be tracked in a first image frame, the target being located at a first position;
  (ii) defining a first template area around the first position;
  (iii) generating a first population of sub-templates by sampling from the first template area;
  (iv) searching for an instance of each of the first population of sub-templates in a second image frame, and determining the location of each instance in the second image frame;
  (v) determining a second position of the target in the second image frame in dependence on the locations of the instances;
  (vi) selecting a selection of the first population of sub-templates in dependence on the locations of the instances of each of the sub-templates in the second frame;
  (vii) defining a second template area defined around the second position;
  (viii) generating a second population of sub-templates comprising the selection of the first population of sub-templates, and a set of new sub-templates generated by sampling from the second template area; and
  (ix) iterating steps (iv) to (viii) above in respect of further image frames, using the second population of sub-templates and the second position from a preceding iteration in place of the first population of sub-templates and the first position, thereby determining a series of target positions, and inferring the target track therefrom,
    wherein the step of identifying a second position of the target comprises the step of determining a permitted area, and constraining the second position to lie within the permitted area, and
    wherein the step of searching for an instance of each of the first population of sub-templates in a second image frame includes searching areas of the second image frame outside the permitted area.

2. The method as claimed in claim 1 wherein the step (iii) comprises determining the location of a best match for each of the first population of sub-templates in the second image frame.

3. The method as claimed in claim 1 wherein the step of generating the second population of sub-templates comprises associating a weight with each of the first population of sub-templates, the weight being related to the location of the instance of said each sub-template in the second frame relative to the second position.

4. The method as claimed in claim 3 wherein each weight is given one of two values in dependence on whether the instance of its associated sub-template is located within or without the second template area.

5. The method as claimed in claim 4 wherein the selection of the first population of sub-templates comprises sub-templates having instances within the second template area.

6. The method as claimed in claim 1 wherein an upper limit is set for the number of sub-templates in the set of new sub-templates.

7. The method as claimed in claim 6, wherein the upper limit is in the range between 5% and 50% of the number of sub-templates in the first population of sub-templates.

8. The method as claimed in claim 7, wherein the upper limit is in the range between 15% and 25% of the number of sub-templates in the first population of sub-templates.

9. The method as claimed in claim 8 wherein the upper limit is 20% of the number of sub-templates in the first population of sub-templates.

10. The method as claimed in claim 1, wherein the step of determining a permitted area comprises providing a maximum target speed, and determining the permitted area in dependence on the maximum target speed, the first position, and the time elapsed between the first and second image frames.

11. The method as claimed in claim 10 wherein the area of the first and second image frames is much larger than the area of the first and second template areas.

12. The method as claimed in claim 1, wherein the step of identifying a second position comprises applying a clustering process to the locations of the instances of the first population of sub-templates in the second image frame.

13. The method as claimed in claim 12 wherein the clustering process comprises the step of convolving a cluster function with the population of instances of the first population of sub-templates, and the second position is the position having the highest value of the resulting convolution.

14. The method as claimed in claim 13 wherein the cluster function has a shape approximately equal to the target template.

15. A tracking system comprising imaging means operable to generate video footage, and processing means operable to carry out a method of tracking a target imaged in video footage, the method comprising the steps of:
(i) identifying the target to be tracked in a first image frame, the target being located at a first position;
(ii) defining a first template area around the first position;
(iii) generating a first population of sub-templates by sampling from the first template area;
(iv) searching for an instance of each of the first population of sub-templates in a second image frame, and determining the location of each instance in the second image frame;
(v) determining a second position of the target in the second image frame in dependence on the locations of the instances;
(vi) selecting a selection of the first population of sub-templates in dependence on the locations of the instances of each of the sub-templates in the second frame;
(vii) defining a second template area defined around the second position;
(viii) generating a second population of sub-templates comprising the selection of the first population of sub-templates, and a set of new sub-templates generated by sampling from the second template area; and
(ix) iterating steps (iv) to (viii) above in respect of further image frames, using the second population of sub-templates and the second position from a preceding iteration in place of the first population of sub-templates and the first position, thereby determining a series of target positions, and inferring the target track therefrom,
wherein the step of identifying a second position of the target comprises the step of determining a permitted area, and constraining the second position to lie within the permitted area, and
wherein the step of searching for an instance of each of the first population of sub-templates in a second image frame includes searching areas of the second image frame outside the permitted area.

16. A non-transitory computer readable medium having recorded thereon a computer program product operable, when the computer readable medium is inserted into a computer, to cause the computer to execute a method of tracking a target imaged in video footage, the method comprising the steps of:
(i) identifying the target to be tracked in a first image frame, the target being located at a first position;
(ii) defining a first template area around the first position;
(iii) generating a first population of sub-templates by sampling from the first template area;
(iv) searching for an instance of each of the first population of sub-templates in a second image frame, and determining the location of each instance in the second image frame;
(v) determining a second position of the target in the second image frame in dependence on the locations of the instances;
(vi) selecting a selection of the first population of sub-templates in dependence on the locations of the instances of each of the sub-templates in the second frame;
(vii) defining a second template area defined around the second position;
(viii) generating a second population of sub-templates comprising the selection of the first population of sub-templates, and a set of new sub-templates generated by sampling from the second template area; and
(ix) (iv) to (viii) above in respect of further image frames, using the second population of sub-templates and the second position from a preceding iteration in place of the first population of sub-templates and the first position, thereby determining a series of target positions, and inferring the target track therefrom,
wherein the step of identifying a second position of the target comprises the step of determining a permitted area, and constraining the second position to lie within the permitted area, and
wherein the step of searching for an instance of each of the first population of sub-templates in a second image frame includes searching areas of the second image frame outside the permitted area.

* * * * *